Figure 6:
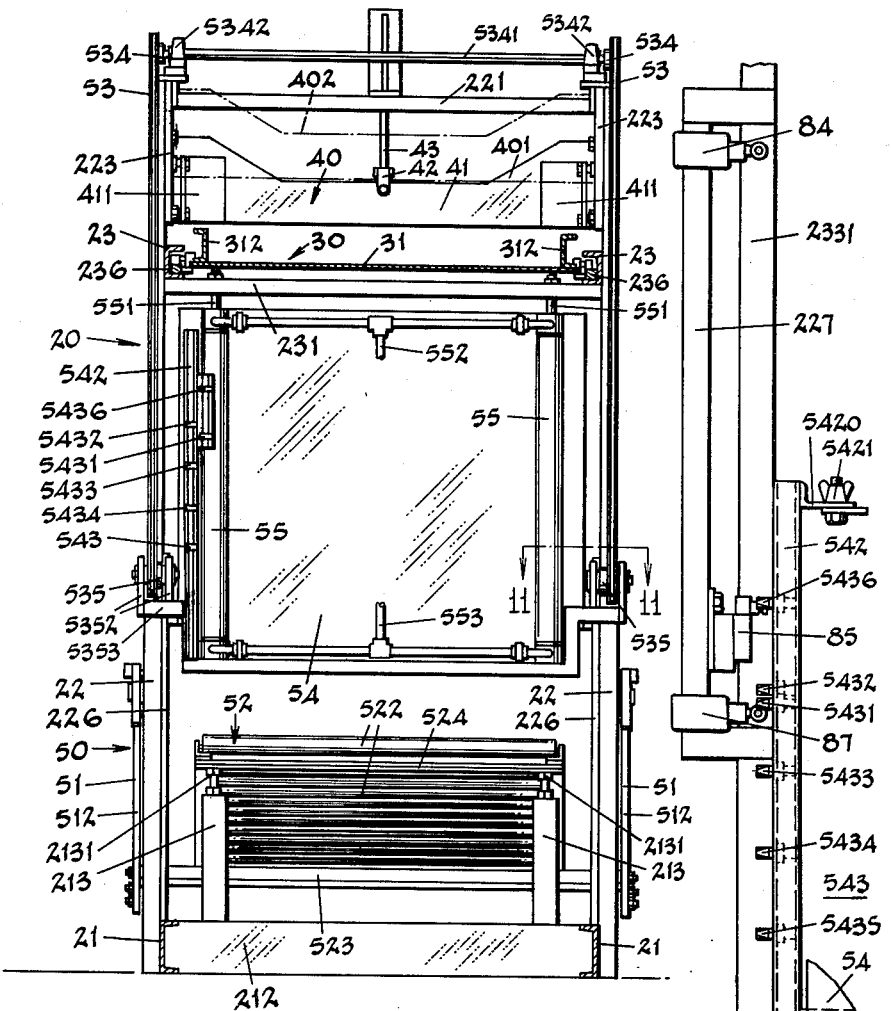

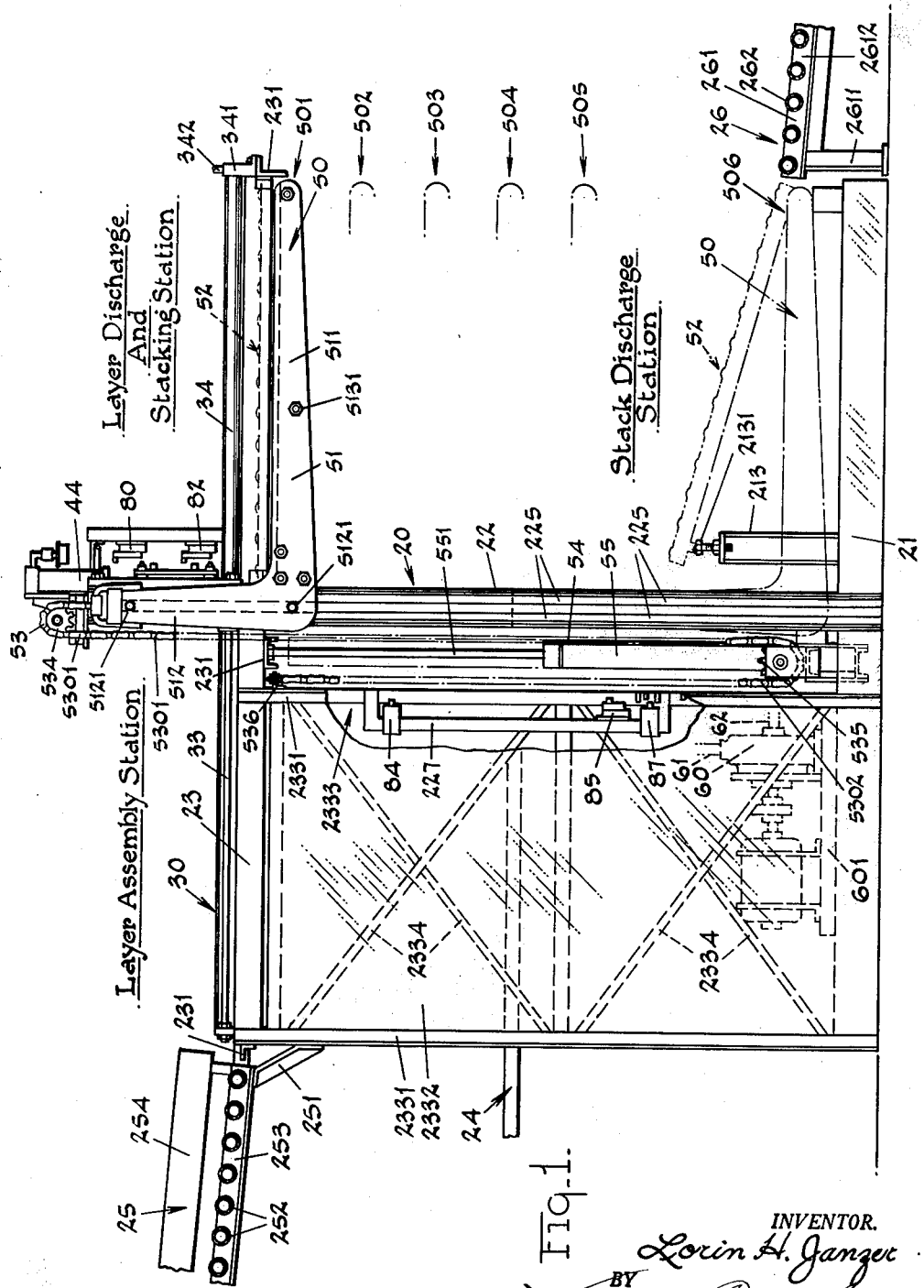

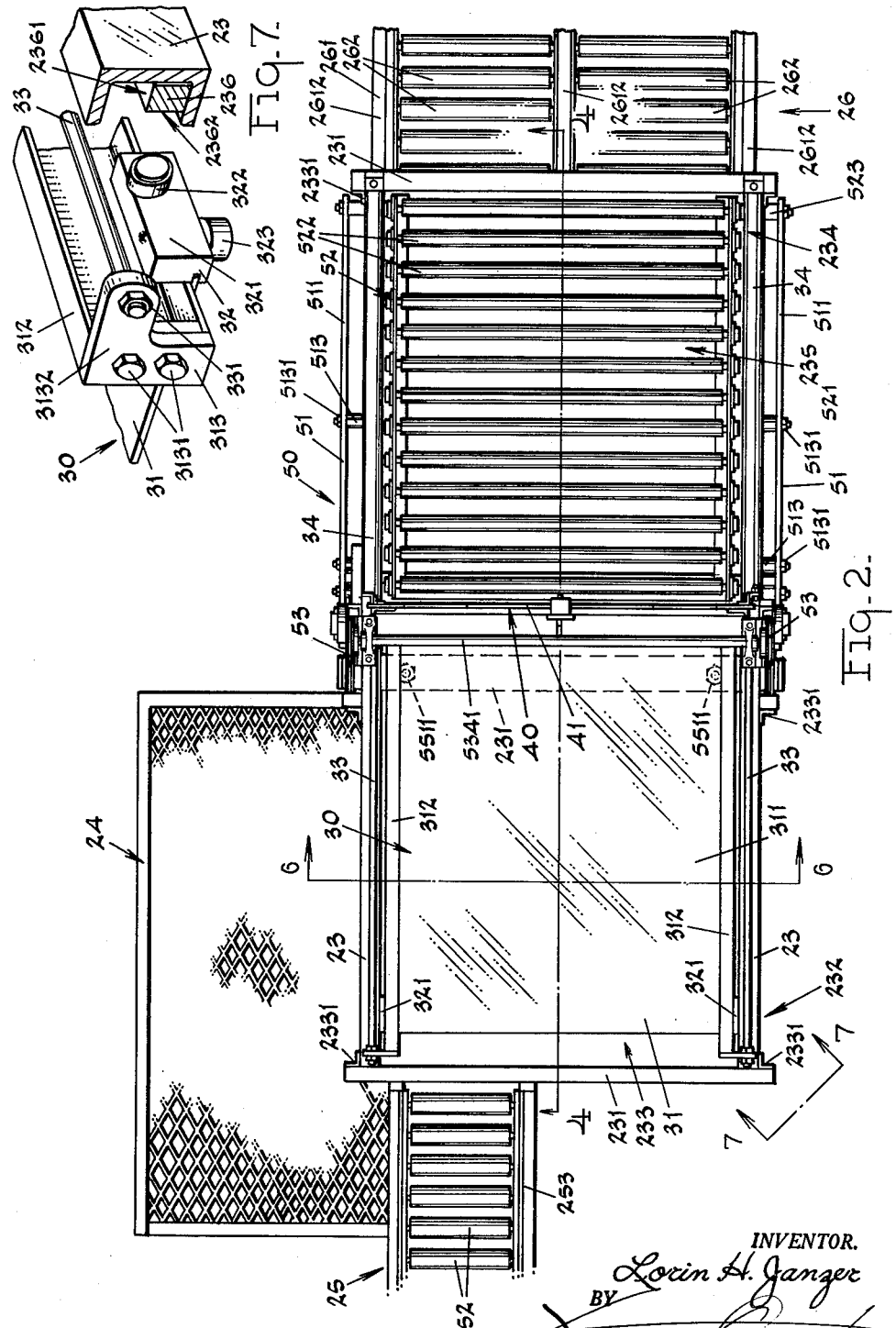

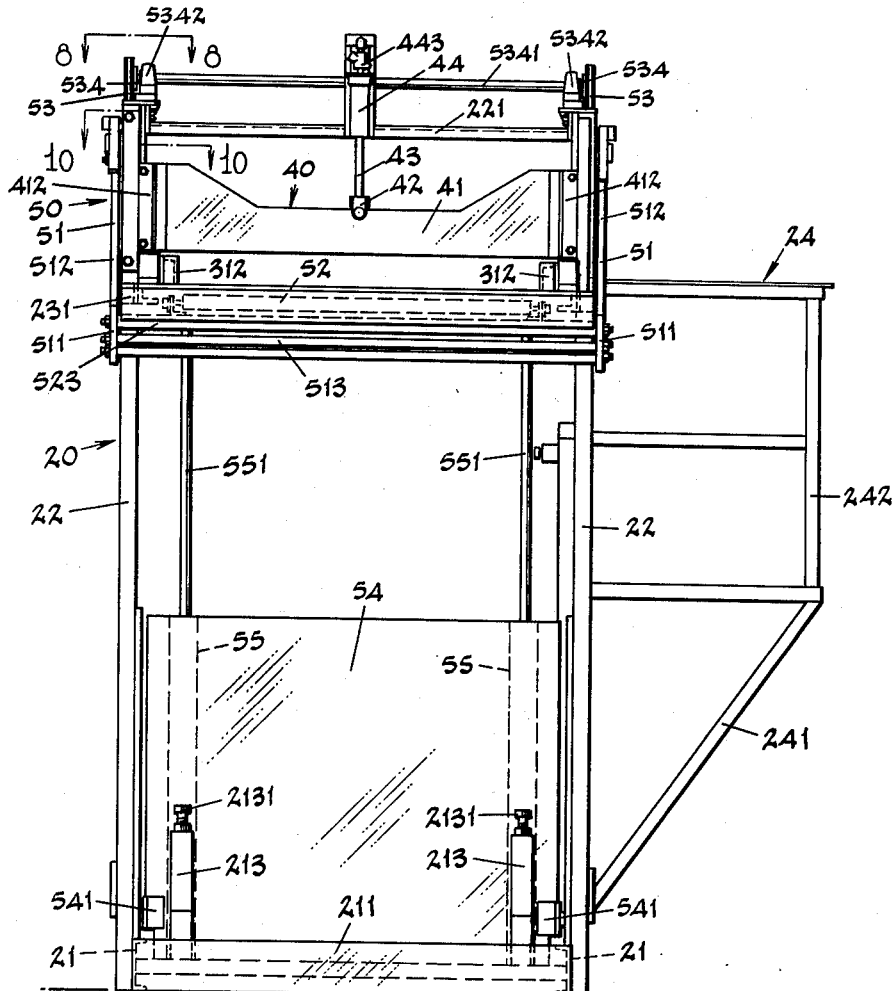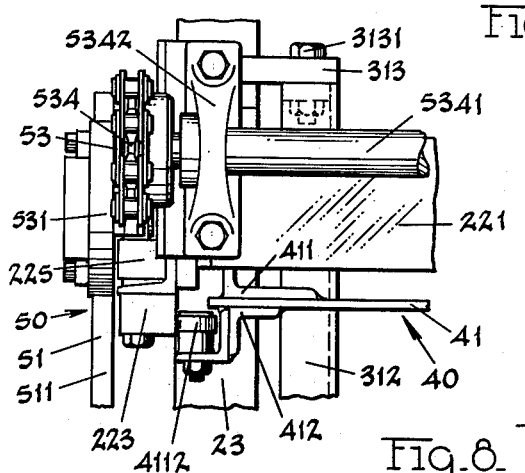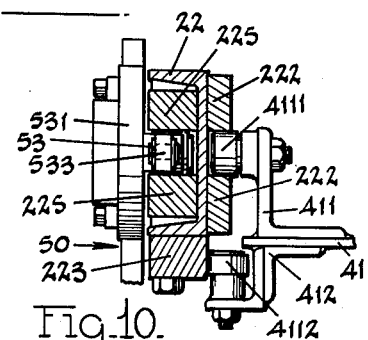

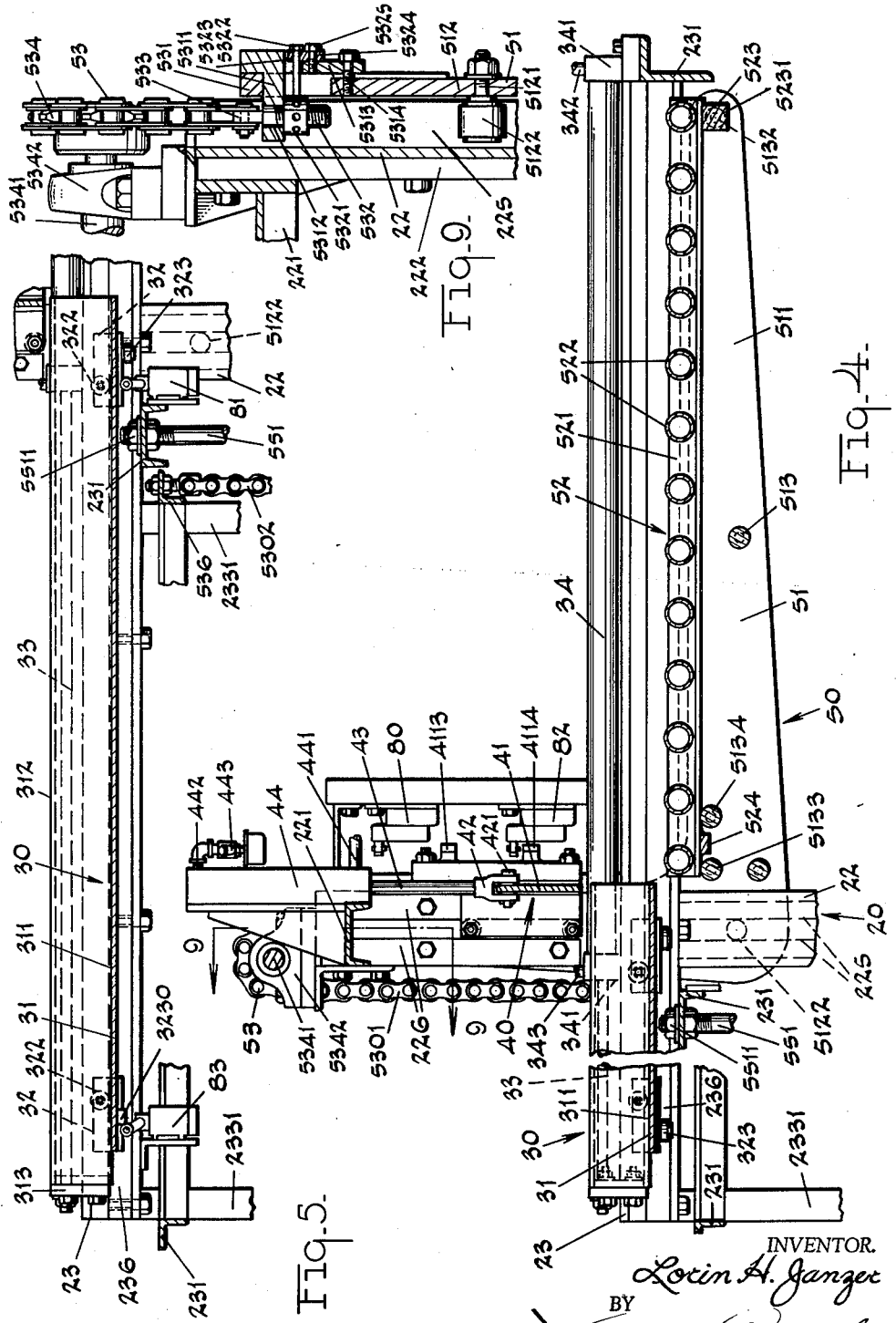

Aug. 31, 1965  L. H. JANZER  3,203,560
ARTICLE LAYER STACKING APPARATUS
Filed Aug. 1, 1962  7 Sheets-Sheet 5

INVENTOR.
Lorin H. Janzer
BY
ATTORNEY

Aug. 31, 1965     L. H. JANZER     3,203,560
ARTICLE LAYER STACKING APPARATUS
Filed Aug. 1, 1962     7 Sheets-Sheet 6

INVENTOR.
Lorin H. Janzer
BY
ATTORNEY

3,203,560
ARTICLE LAYER STACKING APPARATUS
Lorin H. Janzer, Bowling Green, Ohio, assignor to Urschel Engineering Company, Bowling Green, Ohio, a corporation of Ohio
Filed Aug. 1, 1962, Ser. No. 214,084
2 Claims. (Cl. 214—6)

My invention generally concerns the material handling art and particularly a phase thereof wherein layers of bodies, such as those of cartons, are assembled and stacked for handling, for storage, or for shipping. The invention readily lends itself to apparatus which, in the material handling industry, is sometimes referred to as a "palletizer" and by which cartons are assembled, first in layers and then in stacks, usually on pallets for handling, as by fork lift trucks, to desired storage or shipping areas. My invention has for its principal object to teach new and useful improvements in layer stacking apparatus known to the art.

As is well known, in the packaging of many products for subsequent retail sale and distribution, individual product containers, which may be bottles, paper bags or cartons, glass, metal or paper cans are assembled and enclosed in a paperboard carton or case of a substantially parallelepiped form for storage or for shipment to a retailing center. Not only does this method provide convenience in handling the product in the storage or shipment phases but also allows the use of less expensive but more fragile individual product containers. My invention provides improvements in layer stacking apparatus, by which cartons containing individual product containers are individually elevated to a point higher than that to which stacking thereof is contemplated and are there assembled, manually, in layers, which are then mechanically moved to and laid on a pallet or a preceding layer on the pallet to build a stack. The particular improvements provided are an improved open end frame structure in an apparatus of the kind mentioned, a combination of elements by which an improved layer assembly and layer discharge is effected, and a combination of elements assuring an improved stack discharge from the apparatus.

One of the more particular objects of my invention is to provide an article layer stacking apparatus that requires less floor space than that utilized by many of the prior art apparatus. Another particular object of my invention is to provide a frame for an article layer stacking apparatus that not only occupies less floor space but also employs structural members in which load bearing is concentrated and centralized instead of distributed and at random. This enables the use of light gauge structural parts, in trusset arrangement around a main load bearing spine or column element, with resultant economies in material and assembly. In further consequence of this frame arrangement, the stacking and stack discharge stations of the apparatus are open and unrestricted as by bracing struts or piers generally required in prior apparatus. This enables the use of portable pallet feeders or the manual feeding of pallets to the stacker and other efficiencies and economies.

Another of the more particular objects of my invention is to provide means, proximate a layer assembly station of a layer stacking apparatus, that provides a back stop to guide and shape up articles being layered, in layer assembly arrangement at the layer assembly station and subsequently serves to strip the thus assembled layer at the layer discharge station of the stacking apparatus. This eliminates multiple structures for performing these functions and enables the production of a low cost apparatus.

An even more particular object of my invention, in this last connection, is to provide an elongated gate, supported in bridging relation to the path of movement of the layer assembly shuttle plate of the apparatus, as it moves between the layer assembly and layer discharge stations; the gate being vertically movable above such path to a position spaced a distance greater than the height of the layer on the shuttle plate, allowing free passage of the shuttle plate and layer under the gate from the layer assembly to the layer discharge station and being again movable to another position more proximate the path of shuttle plate movement. When in the last mentioned position, the gate serves first, to strip a layer on the shuttle plate from off the shuttle plate, as the shuttle plate returns from the layer discharge station to the layer assembly station, and then, after the shuttle plate has reached the layer assembly station, the gate serves as a back stop and guide in the assembly of the next successive layer on the shuttle plate.

Another particular object of my invention is to provide an article layer stacking apparatus with a layer stack carriage element mounted for tilting movements from a substantially horizontal stack carrying position to an inclined position, such that a layer stack on the carriage element will slide down and off the carriage element, as the same approaches the stack discharge station of the stacking apparatus.

Even more specifically, in connection with the feature just mentioned, it is the object of my invention to provide a stop in the path of movement of the carriage element, as the same is moved by the apparatus stacking elevator, which stop engages the carriage element causing it to tilt progressively as the elevator descends. When the elevator reaches the stack discharge station, the carriage element will have become disposed in a tiled stack discharge position. Thus, discharge of the stack from the apparatus occurs to good advantage, synchronously and automatically.

The invention has other and further objects among which are those of providing other advantageous structures and arrangements which will appear from the following description and from an examination of the accompanying drawings. An article layer stacking apparatus containing my invention may take various forms, one of which now appears to me to be the best mode by which the teachings of my invention may be carried out. I shall describe that form and in doing so will make reference to the accompanying drawings. However, I do not imply, by such description and reference, that variation from such described or illustrated form is beyond the contemplation of any invention I make manifest herein.

FIG. 1 of the accompanying drawings illustrates a side view, in elevation, of an article layer stacking apparatus embodying my invention and of the form selected by me to illustrate the best mode, as it now appears to me, by which the teachings of my invention may be carried out, portions thereof being shown broken away to facilitate illustration.

FIG. 2 of said drawings is a top plan view of the apparatus shown in FIG. 1.

FIG. 3 illustrates a front end view, in elevation, of the apparatus shown in FIGS. 1 and 2.

FIG. 4 in the drawings illustrates an enlarged sectional view taken along the plane of the line 4—4 indicated in FIG. 2, portions thereof being shown in broken juncture.

FIG. 5 shows an enlarged view of a section of the portions of the apparatus illustrated in broken juncture in FIG. 4, the view being taken along the same plane as that on which the view in FIG. 4 is taken.

FIG. 6 in the drawings is a view of a section taken along the plane of the line 6—6 indicated in FIG. 2.

FIG. 7 shows, in perspective, an enlarged view of parts taken along the line 7—7 indicated in FIG. 2, one of the parts being shown in section to facilitate illustration.

FIG. 8 in the accompanying drawings illustrates an enlarged view of apparatus parts taken along the plane of the line 8—8 indicated in FIG. 3.

FIG. 9 shows an enlarged view of a section taken along the plane of the line 9—9 indicated in FIG. 4.

FIG. 10 in the drawings is a view of an enlarged section taken along the plane of the line 10—10 indicated in FIG. 3..

Figures 11, 12:
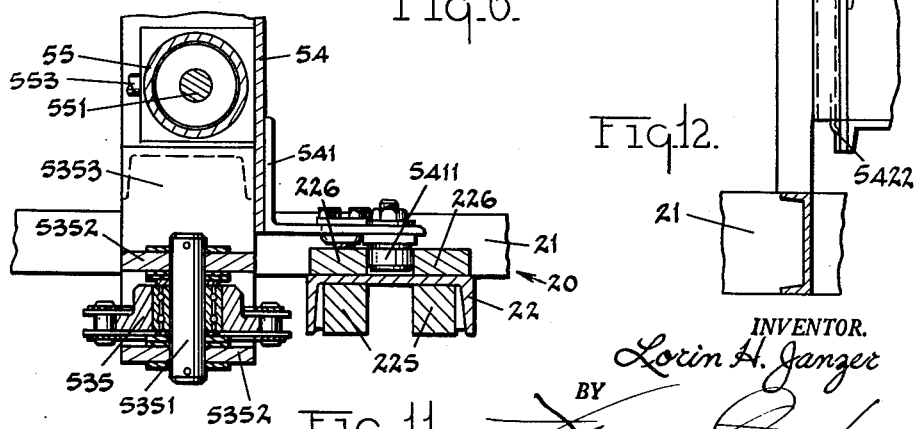

FIG. 11 shows an enlarged view of a section taken along the plane of the line 11—11 indicated in FIG. 6.

FIG. 12 in the accompanying drawings illustrates, in elevation, a detail enlarged view of certain control parts and actuators therefor that are mounted on the apparatus shown in the previously mentioned figures of the drawings.

Figure 13:
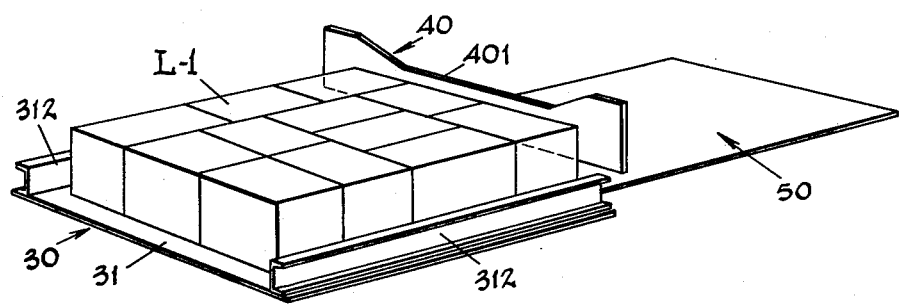

FIG. 13 diagrammatically illustrates certain article layer handling parts of the apparatus shown in the previously mentioned drawing figures and, with the drawing figures (FIGS. 14, 15 and 16) that follow, shows a sequence in the operation of such parts, FIG. 13 illustrating their positions when an assembly of articles into a layer is being effected.

Figure 14:
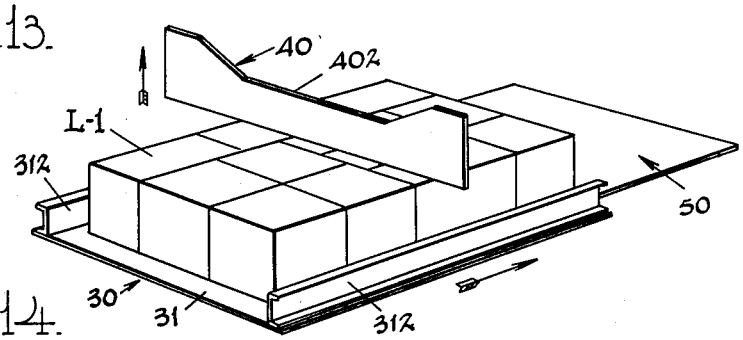

FIG. 14 diagrammatically illustrates the apparatus parts shown in FIG. 13 in a thereto sequential position.

Figure 15:
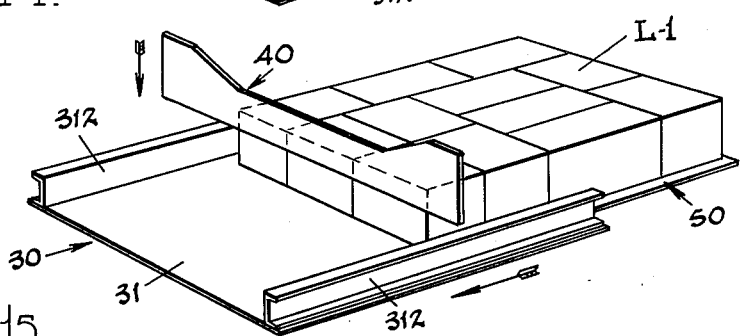

FIG. 15 of the drawings diagrammatically shows the parts shown in FIG. 14 in a thereto sequential position.

Figure 16:
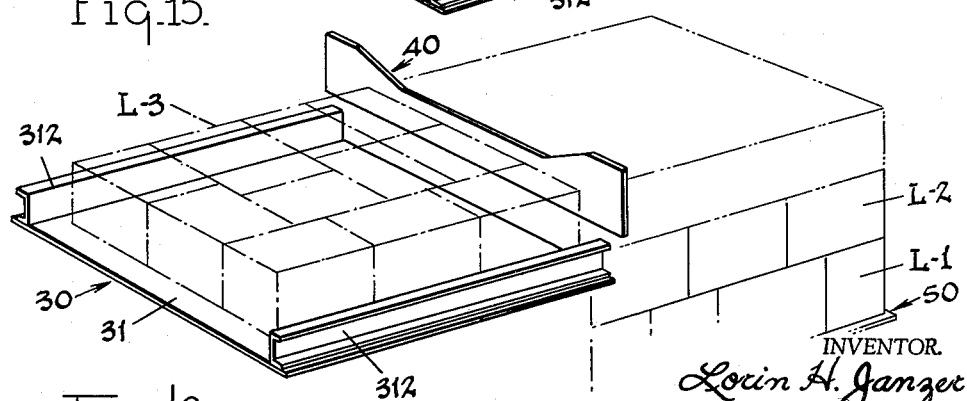

FIG. 16 diagrammatically illustrates the parts shown in FIG. 15 in a thereto sequential position.

Figure 17:
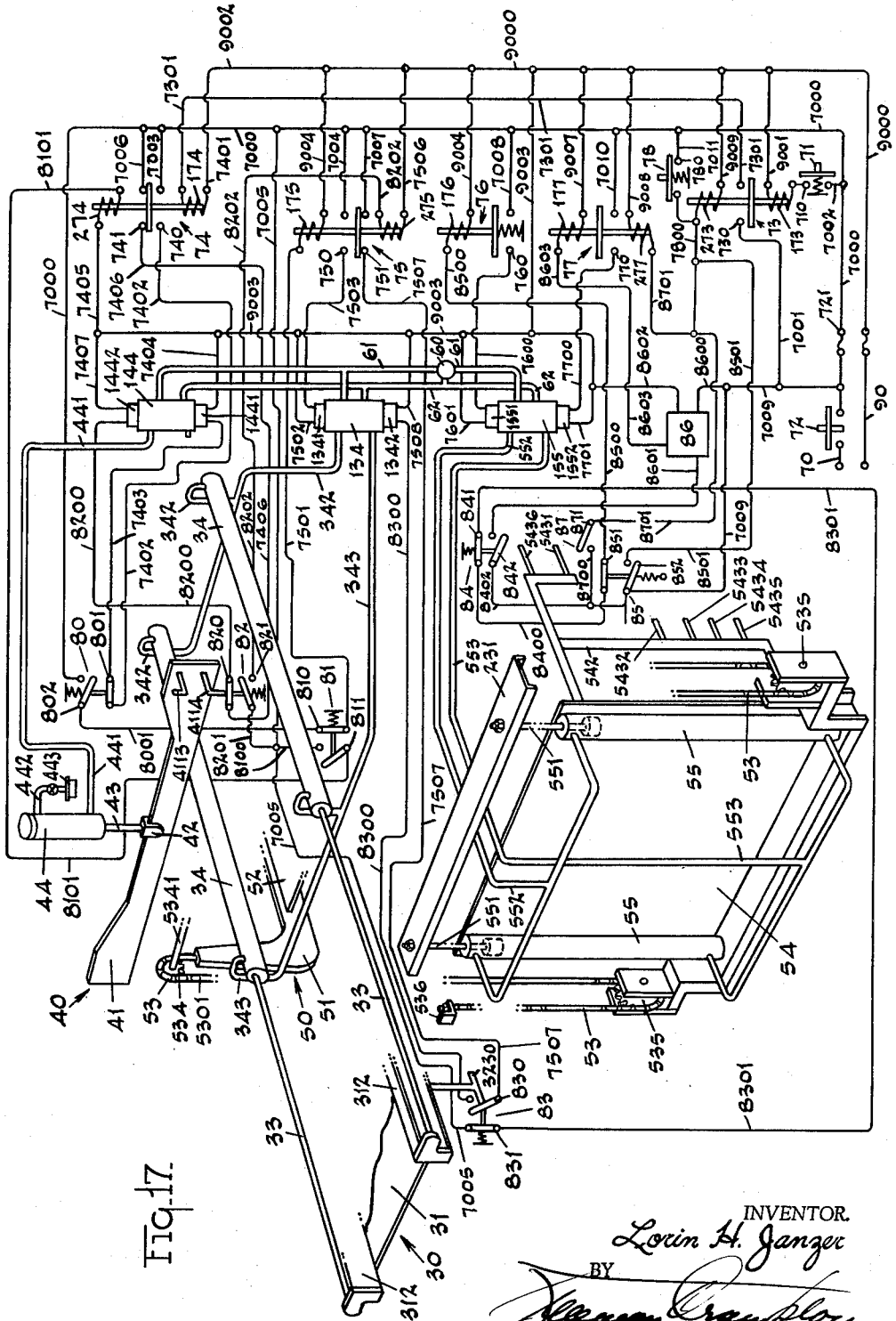

FIG. 17 of the drawings shows, by diagram, the controlling and actuating means by which the apparatus shown in the accompanying drawings is caused to function.

The particular apparatus shown in the drawings may be aptly described as a "semi-automatic," in that except for the assembly of the articles into the layers and the supplying of pallets which are not mechanically provided for but is manually effected, all operations are automatically performed in a predetermined sequence and manner. The features of automatic layer assembly and pallet feeding may, of course, be added through supplementation but their addition increases the original and maintenance costs of the apparatus substantially which, by my design, I have striven to keep low and within the reach of many users.

The apparatus which I show in the drawings includes the primary elements of a supporting frame 20, best illustrated in FIGS. 1, 3 and 6; a layer moving shuttle 30 best shown in FIGS. 2, 5, 7 and 13 to 16 of the drawings; a layer stripping gate 40, well shown in FIGS. 3 4, 6 and 13 to 16; a layer stacking elevator 50, shown to good advantage in FIGS. 1, 2, 4 and 13 to 16 and an actuating means for the elements and controls therefor best shown in FIG. 17.

The supporting frame 20 has three stations from and to which the shuttle 30 and stacking elevator 50 move to perform their respective functions. Such stations, indicated in FIG. 1 of the drawings, are the "Layer Assembly Station"; the "Layer Discharge and Stacking Station"; and the "Stack Discharge Station." The layer discharge and stacking station is (FIG. 1) spaced horizontally from and substantially in plane with the layer assembly station. The stack discharge station is (FIG. 1) spaced vertically and directly underneath and in an aligned umbra relation to the layer discharge and stacking station.

As will later appear in greater detail, the shuttle 30 moves reciprocably between the layer assembly station and the layer discharge and stacking station. In synchrony therewith, the elevator 50 moves from the layer discharge and stacking station to the stack discharge station.

*The frame 20*

Referring particularly to FIG. 1 of the accompanying drawings, it will be observed that the frame comprises a base or footing formed by a pair of parallel spaced and horizontally extending channel irons 21, preferably connected at opposite ends by end pieces 211 and at their mid-sections by a cross piece 212.

Extending upwardly from and connected to the frame footing is a vertically extending spine or pier structure formed by a pair of parallel spaced and vertically extending channel irons 22. The lower ends of the pier irons 22 are connected to substantially mid-section points on the footing irons 21. The upper ends and mid-sections of the pier irons 22 may be suitably braced by truss work, as that provided by cross bars 221. The pier and footing structures bear the entire static load of the apparatus which I shall shortly describe. By such provision, it is possible to reduce the floor space required for apparatus of this kind and to provide an open end machine around which a machine tender or auxiliary equipment may freely move and operate.

The pier structure provided by irons 22 supports yard arms or trestles formed by a pair of parallel spaced and horizontally extending channel irons 23 connected substantially at each of their mid-sections to points on the pier irons 22 near but spaced slightly from the upper ends thereof. In such disposition, the trestle irons 23 extend in cantilever relation from opposite sides of the pier irons 22, in vertically spaced, parallel relation to and above the footing irons 21. In a sense, the footing irons 21 are in umbra relation to the trestle irons 23 and the frame 20 thus far described may be said, when viewed in side elevation, to resemble an upper case I, in which the cap and foot have been greatly exaggerated in length.

The trestle irons 23 are suitably connected together by truss work, as that provided by end pieces 231 which retain the trestle irons 23 in open space spanning relation. Between ends 232 of the trestle irons 23 there is a space 233 that constitutes the heretofore mentioned layer assembly station. The ends 234 of the trestle irons 23 on the other side of the pier irons 22 span a space 235 between them that consitutes the mentioned layer discharge and stacking station.

To provide suitable housing for enclosing the actuating and control means within the frame 20, I connect vertical extending struts 2331 to the ends 233 of the trestles 23 and to the footing irons 21 therebelow and mount suitable sheet steel panels 2332 thereon to enclose a space 2333 below the layer assembly station. If desired, suitable cross straps or braces 2334 may be provided that serve to not only brace panels 2332 but also provide a reinforcing and load withstanding truss work between the footing irons 21 and trestle irons 23. This is advantageous, as will become later apparent.

Auxiliary to the frame 20, there may be a cat walk 24 (FIGS. 2 and 3) suitably braced, as by a shore bar 241, and guarded, as by side rails 242, to provide a working platform at the layer assembly station for a machine operator and feeder. It is the function of this operator to arrange articles, such as cartons, coming to this station in a layer pattern, such as the layer L–1 pattern shown in FIG. 13, and then, operating suitable starter controls, to be hereinafter described, to initiate the cycle of operation of the apparatus.

In order to thus provide the operator with a supply of carton articles, the frame 20 may have a conveyor attachment 25 (FIG. 1) which, by bracket 251, may be secured to frame struts 2331. The attachment 25 has free turning conveyor rolls 252 journaled in side rails 253 from which suitable side guides 254 project so that cartons, by gravity, may roll along the conveyor 25 to within reach of the operator to be manually manipulated and arranged on the shuttle 30.

The shuttle 30

The apparatus operator manually assembles carton articles into a layer pattern on the shuttle 30 at the layer assembly station. Essentially, therefore, the shuttle has a large area surface, such as that provided by a plate 31. The plate 31 (FIG. 2) has an upper lateral surface 311, that is preferably polished to high gloss so that carton articles received from the in-conveyor 25 may be easily slid around and assembled to form a layer L–1 of the kind illustrated in FIG. 13 of the drawings.

The plate 31 has side curbs or guides, such as that embodied in channel irons 312. The side curb channel irons 312 serve to retain cartons being assembled on the surface 311 in a layer and, as shown best in FIG. 7 of the accompanying drawings, additionally provide mounting for elements by which the plate 31 is moved and supported on the trestle irons 23. To that end, the channel of each curb iron 312 opens outwardly and the channel of each trestle iron 23 opens inwardly, all with respect to the surface 311 of plate 31. The irons 312 and 23 form, by so facing each other, an elongated housing in which compound casters 32 that movably support the plate 31 on the trestle irons 23 are mounted.

Each caster 32 (FIG. 7) has a bearing block 321 that is suitably fixed to the plate 31. Each block 321 provides journals to mount wheels 322 and 323 for free rotation, the wheel 322 about a horizontal axis and the wheel 323 about a vertical axis. The wheels 322 and 323 are adapted to bear on the trestle iron 23. Preferably, each trestle iron has a bearing, such as the track 236, disposed within and extending the full length of its respective trestle iron 23. The track 236 provides horizontally extending bearing surface 2361 on which wheels 322 bear and roll and a vertically extending bearing surface 2362 against which wheels 323 bear and roll. Thus, it will be seen that the weight of the plate 31 and any layer of carton articles supported thereby will be borne by the several wheels 322 of the several casters 32 mounted on the plate 31. The plate may hence be easily moved to and fro along the length of the trestle irons 23 and between the layer assembly and layer discharge and stacking stations. The wheels 323, engaging surfaces 2362 of the bearing 236, assure that such movement of the plate 31 will be in line and free from any binding as cocking tendencies might develop.

Actuating means for so moving the plate 31 is also connected to the curb side bars 312. As shown, each side bar 312 has a bracket 313 connected (FIG. 7) at one end thereof by suitable bolts 3131. The bracket 313 has an ear 3132 to which an end of a piston rod 33 may be connected, as by a nut 331. Each piston rod 33 is connected with the piston/cylinder complex 34 (FIG. 4) mounted on the trestle irons 23 by suitable manifold blocks 341 at each end of each piston/cylinder complex 34. Preferably, the piston/cylinder complexes 34 are mounted at the layer discharging and stacking station on the frame 20. One end of each piston/cylinder complex 34 may be connected, by way of its associated manifold block 341 and as by a pipe 342, to a source of fluid under pressure so that when such fluid is introduced through the pipe 342, the plate 31 is moved rightwardly, as viewed in FIG. 1, from layer assembly to layer discharge and stacking stations. Another pipe 343, this one connected to each manifold block 341 at the other end of each piston/cylinder complex 34 conveys fluid under pressure to the complex to cause the plate 31 to return to the layer assembly station. Thus, by controlling the connections of the pipes 342 and 343 to a source of fluid under pressure, as will be later explained, the plate 31 may be caused to shuttle over a path fixed by the trestle irons 23.

In so doing, the plate 31 conveys the layer L–1 assembled thereon (FIG. 14) to the layer discharge and stacking station and (FIG. 15) returns to the layer assembly station so that a subsequent layer may be assembled thereon. That the first mentioned layer L–1 may be discharged for stacking and the plate 31 freed to receive subsequent layer, the plate 31 acts in cooperation with a layer stripping gate 40.

The gate 40

Referring to FIGS. 3, 4, and 6 of the drawings it will be seen that the gate includes a blade 41 supported, like a guillotine, for vertical movement at right angles to and in bridging relation over and across the just described path of movement of the plate 31. The blade 41 has (FIG. 10) hangers 411 and 412 at each end on which wheels 4111 and 4121 are respectively journaled for rotation, each about axes at right angles to the other. The wheels 4111 and 4121 cooperate with bearing tracks to support each end of the blade 41 for vertical movement.

One such track is provided by a pair of spaced parallel strips 222 affixed as to the upper ends of each pier iron 22. The wheels 4111 travel between the strips 222. Another track is provided by a strip 223 also affixed to the upper end of each pier iron. The wheels 4121 bear against their respective strip 223, thus act to guide the blade against bind in the vertical reciprocation along and between the strips 222. The blade, in so moving, moves from a position 401 proximate the path of movement of the plate (FIG. 6) to a position 402 spaced (FIG. 14) a distance therefrom in excess of the height of a layer (L–1) on the shuttle 30 to allow the layer to pass under the lower edge of the blade 41.

In order to move the blade to and from the positions 401 and 402, actuator means is connected to the blade 41, as by a clevis 42. The clevis 42 has a pin part 421 that extends (FIG. 4) through the blade 41. The clevis 42 is threadably connected to a piston rod 43. The piston rod 43 is connected to a piston/cylinder complex 44 supported on a pier iron cross brace 221. One end of the piston/cylinder complex 44 is connected, as by pipe 441, to a source of fluid under pressure so that, when such fluid is introduced through the pipe 441, the blade 41 will be raised to position 402. The other end of the piston/cylinder complex 44 is connected, as by a pipe 442, to a breather valve or gland 443 and thus to atmosphere. When, therefore, the pipe 441 is disconnected from a source of fluid under pressure, as by a valve and in a manner that will be explained, the pipe 442, by allowing air to enter the piston/cylinder complex 44, will permit the blade 41, in response to gravity, to return to position 401.

Consequently, by manipulating the connection of pipe 441, the gate 40 may be raised from positions and relations indicated diagrammatically in FIG. 13 to a position indicated diagrammatically in FIG. 14 and again lowered to the position shown diagrammatically in FIG. 15. In this last mentioned position, shown in FIG. 14, the gate 40 acts to strip the layer L–1 from off the plate 31 at the layer discharge and stacking station. Following the fulfillment of that function, the gate 40 remains in the position at which stripping was effected and serves, as shown both in FIGS. 13 and 16, as a stop or edge guide, in conjunction with curb irons 312, to aid in the assembly (FIG. 16) of a subsequent layer L–3. The layer L–1 stripped from the plate 31 (FIG. 14) at the layer discharge and stacking station is delivered to the stacking elevator 50.

The elevator 50

In order to receive layer L–1 of carton articles as it is discharged off the shuttle 30 and to effect a stacking of such layer with subsequent layers, such as layers L–2 and L–3 in the manner shown in FIG. 16, and to discharge the stack when the same reaches some desired height, the elevator 50 is supported on the frame 20 for vertical downward movement (FIG. 1) between the layer discharge and stacking station and the stack discharging station. In the downward phase of this movement, the elevator moves periodically, from a starting position, indicated at 501, to stages at which the elevator dwells, like those indicated somewhat diagrammatically at 502, 503, 504 and 505 in FIG. 1. The dwell in each instance continues until each subsequent layer (FIG. 16) is placed on the preceding layer through operation of the shuttle 30 and gate 40, in the manner just described. After leaving stage 505, the elevator moves to the stack discharge position indicated at 506, at the stack discharge station.

The elevator 50 includes a pair of L-shaped arms 51. The arms 51, are mounted in spaced parallel relation to each other so that one leg 511 of each arm extends substantially at right angles to the pier irons 22 and substantially in a horizontal plane, parallel with the trestle irons 23. In a sense, the legs 511 project from the pier structure like tines of a giant lift fork extending from under the layer discharge and stacking station.

Each arm 51 has its other leg 512 in movable engagement with a pier iron 22 so that the arms 51 may be moved vertically along a path fixed by the vertical extension of the pier irons. To provide for such movable engagement (FIGS. 1 and 11), the pier channel irons 22 are preferably disposed so their respective channels face outwardly to provide a housing of sorts to receive and mount a pair of track strips 225 therein. The strips 225 of each pair are in spaced parallel relation with each other along the length of each pier iron. Each leg 512 has a pair of vertically spaced journals 5121, each of which mounts a wheel 5122 adapted to bear on and move between and along the track strips 225. By this provision, the elevator arms 51 may be moved to and from the previously described positions 501 and 506.

It is desirable that the arms 51 move as a unit and hence they are connected together (FIG. 4). This may be accomplished by suitable cross rods 513 that engage the projecting legs 511 and bridge the space therebetween. The cross rods 513 and legs 511 may be fixed (FIG. 2) as by nuts 5131 that engage the rod ends. In order that a layer of carton articles, like layer L-1, may be sustained on the arms 51, I provide a carriage or grill 52 between the legs 511.

The carriage or grill 52 includes two spaced parallel side bars 521 that may be of angle iron and provide end journals to rotatably support a plurality of parallel extending, free turning rolls 522 in bridging relation to the side bars. The grill 52 is supported on the legs 511 so that the rolls 522 extend in horizontal load bearing relation and so that the rolling action thereover will be along the length of the legs 511. The support of the grill is novel in my construction being, for reasons that will later appear, that which allows the grill 52 to be bodily tilted relative to the legs 511 and to an inclined plane relation to thereby discharge a stack at the stack discharge station.

To this purpose, the side bars 521 of the carriage grill are joined together. One end of each side bar is joined by a cross bar 523 having journal portions 5231 that bear on one of the cross rods, such as cross rod 5132 joining the arms 51 together. By such provision, the side bars 521 are supported for tilting movement with respect to the elevator arms 51. To further integrate the side bars 251 and to provide an engager, cooperative in the described tilting of the grill as will be later described, there is a strap 524 extending across and joining the other ends of the side bars 521. Certain of the cross rods 513 (FIG. 4), particularly cross rods 5133 and 5134, provide stops on which the grill carriage 52 may rest and be limited in its pivotal movements to that which is operative and contributes to the desired objective.

The described vertical movement of the elevator 50 may be accomplished by any suitable power exerting means. In the form shown in the accompanying drawings, the elevator is caused to move and is controlled in its movement by being connected to a transmission sprocket chain 53 and by such chain to a power activated counter balance 54.

Turning to FIGS. 1 and 9 of the drawings, it will be seen that the upper end of leg 512 of each arm 51 is welded to a yoke 531. The yoke 531, in its web portion, supports a block 5311 that projects rearwardly of the yoke. The block 5311 is bored, as at 5312, to receive a chain connector pin 532 that may be passed therethrough to threadably engage a nut 5321. To further insure securement of the yoke 531 to the leg 512, a plate 5313 (FIG. 9) welded to and spanning the space between opposite legs of the yoke, may be pinned, as by pin 5314, to the leg 512 of the arm 51. Means, such as a pin 5322 extending through an opening 5323 in a face plate 5324, suitably fixed to the plate 5313, as by bolt 5325, and engaging the nut 5321, operates to hold the nut 5321 against free rotation from some adjusted desired position on the chain connector pin 532.

One end of each chain 53 is connected, as by a clevis 533, to the free end of the pin 532 and extends (FIG. 1) around an idler sprocket 534 and then through a downward flight 5301. The downward flight 5301 of each chain 53 terminates in a bight around a second idler sprocket 535 from whence each chain 53 extends in an upward flight 5302 to engage (FIG. 5) and be anchored to a bracket 536 on the frame 20. As shown, the bracket 536 may be suitably fixed to one of the housing cross braces 2331. It will be seen (FIG. 1) that the elevator 50 will be lowered and raised as lengths of the chains 53 are passed over the sprockets 534.

The sprockets 534 (FIG. 8) are mounted for free rotation on journals provided at opposite ends of a shaft 5341. The shaft 5341 may be supported in pillow blocks 5342 suitably fixed to the uppermost end of the pier irons 22. In order, therefore, that lengths of the chains 53 shall be fed over or drawn from off the sprockets 534, it is necessary that means be provided to shorten and lengthen the lengths of the chain flights 5301 and 5302. This, in the form shown in the drawings, is accomplished by moving the sprockets 535 relative the sprockets 534.

The sprockets 535 (FIG. 11) are each journaled for free rotation on a stub shaft 5331 affixed in a suitable manner in trunions 5352 on a bracket 5353 mounted on each side of and movable with the counter balance 54. The counter balance shown is a metal plate sheet having trucks 541 extending therefrom on each side and on which wheels 5411 are journaled for free rotation. The wheels 5411 are adapted to track between a pair of spaced parallel vertical extending strips 226 mounted on the inner side of the pier irons 22. The wheels 5411 and the tracks therefor provided by the strips 226 form guideways for the vertical movement of the plate counter balance 54 and corresponding movement of the sprockets 535 mounted thereon. Hence, by moving the counter balance 54, as by a power actuated means now to be described, raising and lowering of the elevator 50 will be produced.

In the drawings, I show a fluid pressure actuated power means for raising and lowering the counter balance 54. Such means includes a pair of cylinder and piston complexes 55 in which each cylinder thereof is mounted (FIGS. 6 and 11) on the counter balance 54. Piston rod 551 of each complex 55 is fixed at one end to the frame 20, such as by a nut 551 engaging a cross brace 231 of the trestle irons 23. The cylinders of the complexes 55 each have pipes 552 and 553 that may be connected with a source of fluid under pressure. When pipes 552 are so connected, the counter balance 54 will be raised. When the pipes 553 are connected to such source, the counter balance will be lowered. As the counter balance is raised, lengths of the chains 53 from the flights 5301 and 5302 are fed over the sprockets 534 to thus lower the elevator 50. Contrariwise, as the counter balance 54 is lowered, lengths of the chains 53 are drawn from the sprockets 534 to raise the elevator 50. Preferably, the counter balance plate 54 is of such mass that its weight, as exerted through the chains 53 on the elevator 50, equals the weight of the elevator. Consequently, the raising and lowering of the elevator 50 is produced by manipulating valves which control the connections of the pipes 552 and 553 to a source of fluid under pressure.

The downward elevator movements thus produced are such as to cause the elevator (FIG. 1) to move from its 501 position to the position indicated 502 after layer L-1 has been (FIGS. 13, 14 and 15) placed on the elevator. Subsequently, in order to be positioned to receive successive layers, such as layers L-2 and L-3 (FIG. 16), the elevator is moved successively to positions 503 and 504 (FIG. 1). The periodic downward movement of the elevator and dwell thereof, at the mentioned positions along the way to receive successive layers, continues until a stack of a desired number of layers and height has been erected on the elevator. In the form shown in FIG. 1 of the drawings, this occurs when the elevator receives the last and top layer while the elevator is in its position 505.

From this 505 position, the elevator 50 proceeds to the stack discharge station and position 506. In order to automatically discharge the stack erected on the elevator 50 at the stack discharge station, means is provided to tilt the carriage grill 52 from its stack carrying, horizontal position on the elevator 50 to an inclined plane relation, as diagrammatically illustrated in FIG. 1 of the accompanying drawings. When the carriage grill 52 is so tilted, a stack thereon is caused to roll on the rolls 522 off the elevator and on to a roll conveyor 26.

The roll conveyor 26 is conventional having a frame 261, comprising legs 2611 and side and intermediate bars 2612, on which rolls 262 are journaled for free rotation. The legs 2611 support the rolls 262 in a position relative to the path of elevator movement so that, when the elevator reaches its 506 position and the carriage grill 52 has been tilted, a stack on the carriage grill will roll off onto the conveyor 26. Tilting the carriage grill 52 is effected as an incident of the movement of the elevator 50 toward its 506 position and occurs automatically and synchronously during that movement.

To accomplish this, I provide a pair of capstans 213 (FIGS. 1 and 6) that may be supported on and extend upright from the base frame 20, particularly, as from a base mid-iron 212 thereof. Each capstan 213 mounts, in its upper end, a threaded bolt and lock nut assembly 2131, the head of which forms an adjustably positioned stop adapted to engage the cross bar 524 on the carriage grill 52, as the elevator 50 descends toward its 506 position. As shown in the drawings, particularly FIG. 1 thereof, the capstans 213 and particularly the head of the bolt and nut assembly 2131 thereon is at such a height that engagement of the cross bar 523 of the carriage grill 52 occurs at a point during the elevator downward movement that when such downward movement is complete, and preferably not before, the carriage grill 52 will have been tilted to extend in at an inclined plane angle adequate to cause a stack on the carriage grill 52 to roll off and toward and on to the conveyor 26. I show the carriage grill, by reason of capstan engagement thereof and the relative movement of the elevator thereafter, as being tilted to an angle of fifteen degrees to the horizontal. Consequently, the stack on the elevator 50 will roll automatically off the elevator and discharge to the away-conveyor 26.

The movement of the elevator 50 and the periodic dwells thereof in positions 502, 503, 504 and 506 is in synchrony with the operation of the shuttle 30 and gate 40 to produce a "cycle of operation" of all the elements of the entire apparatus. This is accomplished by valves which control the mentioned fluid pressure activated mechanisms in my apparatus. These and certain valve operating electric circuits, whose closing and opening depends on switches actuated by the movements of the shuttle 30, the gate 40 and the elevator 50, will now be described.

*The Operating and Controlling Means*

As has been previously mentioned, the shuttle 30, the gate 40 and the elevator 50 are activated by power means which, in the form shown in the drawings, comprise hydraulic motors. These motors are energized from a source of fluid pressure through suitable control valves which may be actuated in the movement of the shuttle, the gate or the elevator. Such actuation may be, as I have shown, through the medium of electric switches that open and close valve operating circuits in a timed sequence to produce a cycle of operation of desired sequence. FIG. 17 diagrammatically illustrates the hydraulic motors and valve controls therefor and the electrical switch controlled valve operating circuits.

Assuming the shuttle plate 30 is in the layer assembly station (FIG. 1) and that the machine operator has assembled a layer of cartons thereon (FIG. 13), it will be first desirable to lift the gate 40. This, as was previously explained, is effected by energizing the piston/cylinder complex 44 by connecting the pipe 441 to a source of fluid under pressure.

*The hydraulic system*

Such a source of fluid under pressure may be provided by a motor driven, circulating, constant pressure pump 60. A pressure main pipe line 61 extends from the pump 60 and a return main pipe line 62 feeds to the pump or sump thereof. The pump 60 may be mounted on the frame 20. Preferably, the pump 60 is disposed within the housing space 2333, being supported, as by a platform 601 supported by the frame 20, particularly the base structure thereof on that side of the pier structure 22 opposite to that on and along which the elevator 50 moves.

The mass of the pump and its driving motor, together with that of the counter balance 54 and other parts, i.e., pipes, valves and transmissions described or to be described within the housing space 2333, exert a force on that side of the pier structure 22 which is opposite and in counter balance torque relation to that side of the pier structure on which the elevator 50 and a stack load sustained thereby moves. Thus, it is possible in my apparatus to eliminate all vertical struts and bracing in and around the stack discharge station and allow that area to be an open one. This is of advantage, as when it is desired to use pallet feeders at this point. The open area permits such feeding to be done mechanically, as by either portable or permanent equipment, or manually by a machine tender working at this station.

The pressure main pipe line 61 extending from the pump 60 communicates with the pipe 441 of the gate moving piston/cylinder complex 44 through a suitable solenoid operated three-way valve 144. When the valve member in valve 144 is in one of the two positions to which it may be moved, pressured flow, from pipe 61 moves through pipe 441 to the piston/cylinder complex 44, causing the gate 40 to rise. When, however, the valve member in valve 144 is in its other position, the pipe 441 will be connected to the main return line 62 and pipe 61 will be blocked, allowing flow from the piston/cylinder complex 44 back to the pump 60. The fall of the gate 40 occurs at that time, in response to gravity, air being allowed to enter the piston/cylinder complex 44 through pipe 442 and the breather valve or gland 443.

After the gate 40 has been raised, the shuttle 30 is moved from the layer assembly station to the layer discharge and stacking station. Such movement is effected by energizing the piston/cylinder complex 34 by connecting pipe 342 to pipe 61. Such connection may be accomplished by a suitable solenoid operated, four-way valve 134 that is connected to pipes 341 and 342 and to main pipes 61 and 62. The valve 134 has a movable valve member which, when in one position, connects pipe 61 with pipe 342 and pipe 62 with pipe 343. When these pipes are so connected, fluid under pressure enters the piston/cylinder complex 34 causing the shuttle 30 to move from the layer assembly station to the layer discharge and stacking station. When, however, the valve member in valve 134 is in its other position, connections between pipe 61 and pipe 343 and between pipe 62 and 342 are effected, causing pressure flow to the other end of the piston/cylinder complex 34 and producing a return or reverse movement of the shuttle 30 toward the layer assembly station. As must already be apparent, the gate 40 will have been permitted to take its lower position, while the shuttle 30 dwells and before it begins its return movement. This is accomplished by operation of valve 144 in a predetermined and timed relation to the operations of valve 134, as by a means such as will soon be described.

After the shuttle 30 has reached its return position at the layer assembly station, it is desirable to lower the elevator 50. This is so that the layer just deposited thereon by the shuttle may be moved out of the way and below the plane of the path of shuttle movement and thus in position to receive a subsequent layer and to effect a stacking of the layers and those subsequently delivered by the shuttle. The downward movement of the elevator 50 is produced, in a manner previously explained, by the piston/cylinder complex 55 acting on the counter balance 54 and in response to connecting the pipe 552 to a source of fluid under pressure. Such connection is accomplished through the medium of a solenoid operated, four-way, self centering, three position valve 155 connected to pipes 552 and 553 communicating with the piston/cylinder complex 55 and to pipes 61 and 62 connected to the pump 60.

The valve member within the valve 155 is movable to three positions, in one of which, the pressure pipe 61 will be connected to the pipe 552 and the pipe 553 will be connected to return 62. When so connected, the complex 55 will be energized to raise the counter balance 54 and lower the elevator 50. When the movable valve in the valve 155 is in another of its positions, the pressure line 61 will be connected to pipe 553 and pipe 552 will communicate with return 62. Such connection causes the complex 55 to be energized to lower the counter balance 54 and raise the elevator 50. The third position of the movable valve member of the valve 155 is intermediate the two described positions and is such that the valve member blocks flow from or to the pipes 552, 553, 61 and 62. When the valve member of the valve 155 is in this last described position the elevator dwells. Control of the valve 155 and the position of its movable valve member in timed relation to the movements of the shuttle 30 to produce stacking as illustrated in FIGS. 15 and 16 of the drawings is obtained, in part, by electrical circuit means now to be explained.

*The electrical system*

The electrical circuits (FIG. 17) which control and operate the valves 134, 144 and 155 receive power from a source thereof connected by main line tap 70 and return line tap 90. The main line tap 70 connects by main line switch 72 through suitable fuse 721 with lines 7000 and 7002 and with open contacts 710 in a normally open manually operable starting switch 71. Switches 71 and 72 are preferably located at the layer assembly station, in a position convenient to their operation by an operator on the catwalk 24. Hence, by first closing switch 72 and then switch 71, the operator initiates a cycle of apparatus operation in the manner now to be described.

Closing switch 71 establishes a circuit from the main line tap 70 through fuse 721, switch 72, lines 7000 and 7002, contacts 710 of switch 71, solenoid 173 of a double action, solenoid operated relay switch 73, lines 9001 and 9000 to return tap 90. The current flow through this circuit energizes the coil 173 and causes the relay switch 73 to close, bridging contacts 730 thereof. The closure of relay 73 establishes and holds a circuit from tap 70, through switch 72, lines 7000 and 7001, contacts 730 of switch 73 and line 7301, solenoid 174 of a double action, solenoid operated relay switch 74, line 7401, to lines 9002 and 9000, and return tap 90. This circuit energizes coil 174 and causes relay switch 74 to close across its contacts 740.

Bridging contacts 740 establishes a circuit that begins at source 70, through switch 72, lines 7000 and 7003, contacts 740 of relay 74, line 7402, normally closed contacts 801 of a dual limit switch 80, line 7403, actuating coil 1441 of the solenoid operated valve 144, lines 7404, 9003 and 9000 to source return tap 90. The flow of current through this circuit causes the movable valve member in valve 144 to move to a position connecting the pressure pipe 61 to pipe 441 with the consequence that the gate 40 will be raised.

As the gate 40 moves into its upward stroke, an actuator 4114, mounted on the gate 40, disengages dual limit switch 82, allowing normally closed contacts 820 thereof to close and normally open contacts 821 thereof to open. When the gate reaches the terminus of its upward stroke, a second actuator 4113, also mounted on the gate 40, engages and operates the dual limit switch 80, opening the normally and then closed contacts 801 and closing the normally and then open contacts 802 thereof. Opening the closed contacts 801 of switch 80 opens the previously described circuit by which the movable valve member of valve 144 was moved to gate raising position. Closing the opened contacts 802 of switch 80 establishes a circuit which moves the valve member in valve 134 to a position to cause the shuttle 30 to move from the layer assembly station toward the layer discharge and stacking station.

This circuit originates at the source main lead tap 70 and includes switch 72, line 7000, now closed contacts 802 of the limit switch 80, line 8001, the normally closed contacts 810 of the limit switch 81, line 7501, solenoid 175 of a double action, solenoid operated relay switch 75, lines 9004 and 9000 to return tap 90. With the make of this circuit, relay switch 75 is actuated to close the contacts 750 thereof, completing an operating circuit to move the valve member in valve 134. Such circuit comprises the source 70, switch 72, line 7000, line 7004, contacts 750 of relay 75, line 7503, operating coil 1341 of the valve 134, line 7502, lines 9003 and 9000 to return tap 90. Having thus energized the coil 1341, the movable valve member in the valve 134 is moved to a position connecting pipe 61 to pipe 342 and pipe 343 to exhaust pipe 62. Fluid under pressure is thus introduced to the piston/cylinder complex 34 and the shuttle 30 is moved from the layer assembly station to the layer discharge and stacking station.

As the shuttle 30 leaves the layer assembly station, an actuator 3230, mounted thereon, disengages a dual limit switch 83, allowing the normally closed contacts 830 thereof to close and the normally open contacts 831 thereof to open. When the shuttle reaches the end of its stroke in a direction toward the layer discharge and stacking station, the actuator 3230 engages and moves the limit switch 81, opening the normally closed contacts 810 thereof and closing the normally open contacts 811 thereof. Opening contacts 810 breaks the described relay 75 circuit energizing the operating coil 1341 of the valve 134. Closing the contacts 811 establishes a circuit by which the gate 40 is permitted to lower, in preparation for stripping the layer from the shuttle 30.

Such circuit comprises the source 70, switch 72, lines 7000, 7005, 8100, contacts 811 of limit switch 81, line 8101, solenoid 274 of relay 74, line 7405, lines 9003 and 9000 to return tap 90. Completion of this circuit causes relay 74 to open contacts 740 and now close across then open contacts 741 thereof, completing a circuit to operate gate valve 144. This circuit consists in source lead 70, switch 72, lines 7000 and 7006, contacts 741 of relay 74, line 7406, closed contacts 820 of a dual limit switch 82, line 8200, operating solenoid 1442 of the valve 144, line 7407, lines 9003 and 9000 to return 90. This circuit causes the movable valve member in valve 144 to move to a position in which pipe 441 is connected to low pressure return pipe 62 to drain the piston/cylinder complex 44. The weight of the gate 40 now causes the gate to descend until the actuator 4114 engages the dual limit switch 82 opening the closed contacts 820 thereof and closing its then open contacts 821.

Opening the contacts 820 opens the described circuit through the operator solenoid 1442 of the valve 144 and closing the contacts 821 establishes a circuit by which the return movement of the shuttle 30 is initiated. Such circuit comprises source lead 70, switch 72, lines 7000 and 7005, line 8201, now closed contacts 821 of the limit switch 82, line 8202, coil 275 of relay 75, line 7506, and lines 9002 and 9000 to return 90. When thus completed, this circuit causes relay 75 to open the then closed contacts 750 thereof and close the contacts 751 of the relay 75. This establishes a circuit that causes operation of the valve 134 to produce a return stroke of the piston/cylinder complex 34.

This valve operating circuit consists in source lead 70, switch 72, line 7000, line 7007, closed relay 75 contacts 751, line 7507, normally closed contacts 830 of the dual limit switch 83, line 8300, operating coil 1342 of the valve 134, lines 7508, 9003 and 9000 to return tap 90. By this circuit, the operating coil 1342 is energized to move the movable valve member of valve 134 to a position in which pressure pipe 61 is connected to pipe 343 and pipe 342 is connected to the low pressure return pipe 62. Such connection causes the shuttle 30 to return to the layer assembly station, in the course of which, a layer thereon is stripped from the shuttle 30 by the gate 40 and deposited on the elevator 50. When the shuttle reaches the layer assembly station, the actuator 3230 on the shuttle engages the dual limit switch 83 to open the normally closed contacts 830 thereof in the valve 134 control circuit just described and to close the normally open switch 83 contacts 831. Closure of the contacts 831 establishes a circuit by which the elevator 50 is now lowered to move the layer that has been just deposited on it by the shuttle 30.

The circuit established by the closure of contacts 831 begins at the source lead tap 70 and extends through switch 72, lines 7000 and 7005, closed contacts 831 of the limit switch 83, line 8301, normally closed contacts 841 of a dual limit switch 84, line 8400, normally closed contacts 851 of a single direction operational, dual limit switch 85, line 8500, coil 176 of a normally open, solenoid closed relay 76, line 9004, line 9000 to return 90. Activation of the coil 176 produced by this circuit cause relay 76 to close its open contacts 760, thus establishing a circuit from the source 70 through switch 72, lines 7000 and 7008, closed contacts 760, line 7600, operating coil 1551 of valve 155, line 7601, lines 9003 and 9000 to return 90.

This circuit serves to activate the movable valve member of valve 155 from its self centering position to one by which pressure pipe 61 is connected to pipe 552 and pipe 553 is connected to the low pressure return 62. With such connection the piston/cylinder complex 55 is actuated to raise the counter balance 54 and, through the chains 53, lower the elevator 50 below the plane of the path of reciprocation of the shuttle 30. In order that the elevator 50 will, after receipt of the first layer, descend (FIG. 1) to the stage 502 and there dwell, pending delivery of the next successive layer and successively dwell at stages 503, 504 and 505 after the delivery of successive layers, the counter balance 54, as is best shown in FIGS. 6 and 12 of the accompanying drawings, mounts a "program" panel 542.

The program panel 542 may be connected to the counter balance 54, as by a bracket 5420, wing-nut 5421 and bottom clip 5422. The panel 542 supports protruding cams 543, that may be adjustably located in spaced relation along vertical lines over one surface of the panel 542. The limit switches 84 and 85, already mentioned, as well as a therewith cooperating limit switch 87 to be later described, are all adjustably mounted on a bracket 227 attached (FIG. 6) to the frame 20, as for example to one of pier irons 22 thereof. The bracket 227 is disposed to locate the limit switches 84, 85 and 87 mounted thereon in the paths of movement of the cams 543, as the counter balance 54, moving in its stroke, moves the panel 542. Thus, as the counter balance 54 is caused to rise, through activation of the piston/cylinder complex 55, the program panel 542 will move with reference to the positions of the limit switches on the bracket 227. In the course of such movement, certain cams 543 engage, operate, and disengage certain limit switches to produce periodic dwells in the downward movement of the elevator 50, at stages 502, 503, 504 and 505, and finally, after leaving stage 505, movement to the stack discharge station position 506 and then reversal to effect subsequent return to and shut down at the layer discharge and stacking station for a new cycle.

It will be remembered that when the description of the program panel 542 was first introduced here, a circuit to activate the movable valve member of valve 155 to a position whereby the counter balance 54 was being raised and the elevator 50 lowered had been described as established. The normally closed contacts 851 of the limit switch 85 comprise a part of that circuit. The movement of the counter balance and elevator continues until the single direction operational limit switch 85 is engaged and operated by one of the cams 543, such as the cam 5432, which effects an opening of contacts 851 and a closing of the normally open contacts 852 of the switch 85. The opening of the normally closed contacts 851 of switch 85 interrupts the circuit through the valve operating coil 1551 of the valve 155, by releasing relay 76 to open relay contacts 760 in the circuit of operating coil 1551 of valve 155 allowing the movable valve member therein to center and, in effect, locking the piston/cylinder complex 55 and counter balance 54 in stationary positions to support the elevator 50 at stage 502. The closing of normally open contacts 852 of the single direction operational limit switch 85 makes a circuit originating at the source lead tap 70 and including switch 72, line 7000, line 7009, now closed contacts 852, line 8501, line 7309, solenoid 273, line 9009, line 9000 to return 90. Flow of current through this circuit energizes coil 273 moving the relay 73 to open contacts 730 thereof.

Now, until the operator at the layer assembly station has assembled a successive layer on the shuttle 30 and again operates the starter switch 71, the apparatus will remain in standby condition. Operating the switch 71 will initiate a new sub-cycle in which the sequence of gate rise, shuttle travel, gate lowers, shuttle returns and elevator descends and dwells will be as heretofore described. The cams 5433, 5434 and 5435 all in a vertical line on the program panel 543 each operate by engaging and operating the single direction operational limit switch 85 to shut the apparatus down at points at which the elevator 50 is positioned at stages 503, 504 and 505 with the result that, in the particular embodiment shown, five layers will have been stacked on the elevator 50, when the elevator begins its descent from stage 505 with a stack enroute to the stack discharge station and position 506.

As the elevator 50 moves from stage 505 and approaches 506 position, at which a stack on the carriage grill 52 will be rolled off the grill and on to the conveyor 26, a cam 5436, vertically and horizontally spaced from the line of cams 5432, 5433, 5434 and 5435 on the program panel 543 engages the limit switch 84, as a consequence of counter balance movement. Such engagement opens normally closed contacts 841 and closes normally open contacts 842 of switch 84. Opening normally closed contacts 841 of switch 84 interrupts the described circuit to relay coil 176 and the relay 76 opens. As before described, opening relay contacts 760 opens, the energizing circuit to valve 155 actuating coil 1551 and allows the valve member in valve 155 to center. This ends the upward stroke of the counter balance 54 and downward stroke of the elevator 50 at position 506 thereof. Closing of normally open contacts 842 of the limit switch establishes a circuit to a timer relay 86. This circuit originates at the source lead tap 70 and extends through switch 72, lines 7000 and 7009, line 8402, now closed contacts 842 of switch 84, line 8601 to the timer relay 86, line 8602, line 9000 to return 90. The timer relay 86 is in circuit from the source 70, by means of switch 72, lines 7009, 8600, relay timer 86, line 8602 line 9000 to return tap 90. The timer relay 86, after a set interval, sufficient to allow a stack on the carriage grill 52 to roll off and on to the away-conveyor 26, connects by line 8603 with solenoid 177 of relay 77 and line 9007 and line 9000 with source return 90. Such circuit actuates a relay 77 to close its contacts 770.

Relay 77 is a double action solenoid operated switch. Closing the contacts 770 of relay 77 makes and, until activation of the opposite solenoid 277 thereof, maintains a circuit from the source lead tap 70 through switch 72, line 7000, line 7010, closed relay contacts 770, line 7700, operating coil 1552 of the valve 155, line 7701, lines 8602 and 9000 to source return tap 90. This circuit activates the movable valve member in the valve 155 to a position in which pipe 553 is connected to pressure pipe 61 and pipe 552 to low pressure return pipe 62. In consequence of this activation, the elevator 50 begins its return stroke toward the starting position 501.

During the return trip of the counter balance 54 and elevator 50, the cams 5432, 5433, 5434 and 5435 will of course periodically contact switch 85 in reverse direction to that in which the switch 85 was engaged on the down stroke of the elevator. This will be of no consequence in the circuits because, as was previously mentioned, switch 85 is operative only upon engagement thereof in one direction, specifically, when the cams engage it in their up-stroke movement.

As the elevator reaches the starting position 501, the counter balance 54 reaches its lowest position (FIG. 12) in the frame 20 and cam 5431 vertically and horizontally spaced from the other mentioned cams on the program panel 543 engages a limit switch 87 to close the normally open contacts 871 thereof. Closing contacts 871 establishes a circuit from the source lead 70, switch 72, lines 7000, 7009 and 8402, line 8700, now closed contacts 871 of switch 87, line 8701, solenoid 277 of relay 77, line 9008, line 9000 to return 90. Completing this circuit energizes coil 277 to move the relay 77 to open across contacts 770 thereof breaking the circuit to operating coil 1552.

Opening the circuit of the coil 1552 allows the movable valve member in valve 155 to move to its centering position stopping further pressure flow through either of pipes 553 and 552 and bringing the elevator to rest in its uppermost 501 position. Closing contacts 871 also establishes a circuit to operate relay 73 to open contacts 730 thereof. This circuit extends from source 70 through main switch 72, lines 7000 and 7009, line 8402, line 8700 closed contacts 871 of switch 87, line 8701, line 7800, solenoid 273, line 9009, line 9000 to return 90. Such circuit moves the relay 73 to open the contacts 730 thereof and the circuits stand mute, awaiting subsequent operation of the starting switch 71.

Emergency stop switch 78 also connects, when closed, with the coil 273, the circuit being from lead tap 70, main switch 72, line 7000, line 7011, contacts 780, line 7800, coil 273, lines 9009 and 9000 to return source 90. The switch 78 is positioned, like the starting switch 71, within easy reach of the operator on the catwalk 24.

*Operation*

Assuming the main switch 70 has been closed, carton bodies, on the in-conveyor 25, continuously feed to an operator on the catwalk 24, who arranges the same in a layer on the shuttle surface 311, using side curbs 312 and the gate 40 (FIG. 13) as guides. A layer completed, operator closes the switch 71, causing the gate 40 to rise to a point higher than the completed layer. Automatically, when the gate 40 reaches the end of its up stroke at position 402 (FIG. 6) and not before, the shuttle 30 carrying the layer moves (FIG. 14) from the layer assembly station toward the layer discharge and stacking station, under the gate 40. Arriving at the latter station, the gate then and not before automatically descends (FIG. 15) to its original position. Immediately, but not sooner than after the gate 40 reaches its lowermost position 401 (FIG. 6), the shuttle 30 begins its return stroke (FIG. 15) stripping the layer off the shuttle and on to the elevator 50.

When the shuttle arrives at the layer assembly station, preparatory to receive a subsequent layer, the elevator 50 after such arrival and during the assembly of such subsequent layer, is lowered to position 502, in preparation for the subsequent advancing stroke of the shuttle 30 with a subsequent layer. This sequence and series of sub-cycle operations continue until, in the apparatus shown, five layers have been stacked on the elevator 50. When that occurs, the elevator sinks to the stack discharge station, causing the carriage grill 52 to tilt as described and the stack on the elevator to roll out on to the away-conveyor 26. After a time period to allow the stack to so discharge, the elevator 50 returns to its starting position and dwells awaiting receipt of the first layer of the next successive stack.

If desired, pallets on which the layers may be stacked may be positioned on the elevator carriage grill 52 before the layers are delivered to the elevator 50. This may be accomplished as elevator 50 rises from the stack discharge station and becomes again horizontal, after tilting discharge of the stack, either manually or mechanically by a tender that, because of the open space around the frame 20 at the stack discharge station, is free to operate.

It will be seen that I teach the art the construction of a simple, low cost readily adaptable stacking apparatus. For example, by varying the vertical spacing between the cams 5432, 5433, 5434 and 5435 or the number used on the program panel 54, my apparatus may be quickly adapted to handle cartons or layers thereof of a different height and the number of layers may be varied to meet the needs or desires in stacking. Those skilled in the art will readily appreciate that this and many other features of my apparatus serve the needs of practicality and adaptability in the field where such apparatuses serve.

I claim:

1. For use in an article layer stacking apparatus comprising
   a frame having thereon an article layer stacking station and a stack discharge station below and in vertically spaced aligned relation with the layer stacking station
   and an elevator mounted on the frame for movement between said stations and having means thereon adapted to receive and support successive and accumulative article layers in the downward movement of the elevator thus to form a stack of layers and, on arrival at the stack discharge station to discharge the stack from the elevator and outwardly with respect to the frame,
   the improvement in which said means includes
   a carriage element having a load carry area thereon of dimensions in length and width exceeding the length and width of an article layer to be stacked;
   a bearing in engagement with said carriage element at a point on a line substantially coincident with a perimeter of said load carry area thereof and with an outer end of the elevator for pivotally supporting the carriage element for translatory movement relative to the elevator about an axis substantially coincident with said perimeter;

a stop in engagement with the elevator and inwardly of the outer end of the elevator and of the engagement of the bearing therewith and in a position thereon to be engaged by the carriage element in the translatory movement thereof about said bearing at a point therein in which said carriage element extends to locate the load carry area thereof in a substantially horizontal position to receive and support successive and accumulative article layers; and a second stop in engagement with the frame in a position to be engaged by the carriage element at a point thereon spaced from said bearing engaged perimeter and at a point in the downward movement of the elevator whereby the inner end of the carriage element is moved upwardly relative to the elevator from engagement with the first mentioned stop and about the axis of said bearing as the elevator approaches the stack discharge station and so that, upon arrival of the elevator at the stack discharge station, the carriage element will be positioned that the load carry area thereof is in an inclined plane to discharge an article layer stack supported thereon by force of gravity.

2. The improvement described in claim 1 in which the therein described load carry area of the carriage element comprises a plurality of elongated rolls in engagement with the carriage element and supported for free rotation about spaced axes in parallel extending relation to each other and to the axis of translatory movement of the carriage element provided by the mentioned bearing and adapted to provide a live roll grill to support successive and accumulative article layers when the carriage element is positioned to locate the grill substantially horizontally and a conveyor runway from the elevator and outwardly of the frame, when the carriage element is tilted to locate the grill in an inclined plane, as aforesaid.

References Cited by the Examiner

UNITED STATES PATENTS

| | | | |
|---|---|---|---|
| 503,326 | 8/93 | Mock | 214—99 |
| 2,207,053 | 7/40 | Fivecoate | 187—11 |
| 2,459,045 | 1/49 | Pride | 214—517 |
| 2,563,514 | 8/51 | Brosamer | 214—95 |
| 2,699,264 | 1/55 | Bruce et al. | |
| 2,703,182 | 3/55 | Broberg et al. | |
| 2,707,572 | 5/55 | Rothman | 214—309 |
| 3,050,199 | 8/62 | McGrath et al. | |
| 3,081,888 | 3/63 | Lawson. | |

FOREIGN PATENTS 349,298  5/31  Great Britain.

GERALD M. FORLENZA, *Primary Examiner.*

MORRIS TEMIN, HUGO O. SCHULZ, *Examiners.*